United States Patent [19]

Rucinski et al.

[11] Patent Number: 5,216,818
[45] Date of Patent: Jun. 8, 1993

[54] TWO-POINT INTERNAL DIAMETER MEASUREMENT GAGE

[75] Inventors: David W. Rucinski; Ronald Aurnou, both of Roch; Joel A. Neal, Palmyra, all of N.Y.

[73] Assignee: Quality Measurement Systems Corp., Macedon, N.Y.

[21] Appl. No.: 804,040

[22] Filed: Dec. 9, 1991

[51] Int. Cl.⁵ .................................................. G01B 5/08
[52] U.S. Cl. ........................................ 33/542; 33/555; 33/555.1; 33/803; 33/805
[58] Field of Search .............. 33/783, 784, 792, 803, 33/804, 805, 806, 810, 811, 542, 545, 549, 555, 555.1, 555.2, 555.3, 522

[56] References Cited

U.S. PATENT DOCUMENTS

| | | | |
|---|---|---|---|
| 2,216,796 | 10/1940 | Aller | 33/803 |
| 2,427,924 | 9/1947 | Rose | 33/784 |
| 2,849,797 | 9/1958 | Etchell | 33/804 |
| 2,953,854 | 9/1960 | Johnston | 33/803 |
| 3,222,788 | 12/1965 | Neslund | 33/542 |
| 3,346,964 | 10/1967 | Schiller et al. | 33/803 |
| 4,148,146 | 4/1979 | Holland | 33/803 |
| 4,208,796 | 6/1980 | Michand et al. | 33/784 |
| 4,326,336 | 4/1982 | Hreha | 33/555 |

Primary Examiner—William A. Cuchlinski, Jr.
Assistant Examiner—Alvin Wirthlin
Attorney, Agent, or Firm—Shlesinger, Fitzsimmons & Shlesinger

[57] ABSTRACT

A pair of anvil pins are mounted at their lower ends on a pair of spaced carriers, which reciprocate beneath a work supporting surface in horizontally spaced, colinear paths. The pins project upwardly through an elongate slot in the work surface and into a bore in an annular workpiece positioned on the surface. One carrier is urged by a spring in one direction to cause its anvil pin to urge the outer periphery of the workpiece into a V-shaped recess in a locator plate that is adjustably secured on the work surface, thereby to center the workpiece over the slot. An indicator mounted on the other carrier has a resilient probe extending between the carriers to urge them apart, and thereby to urge their pins against diametrally opposite sides of the bore, whereby a readout on the gage will indicate the extent to which the I.D. of the bore differs from a predetermined value. One pin is adjustable on its carrier to accomodate the gage for measuring particularly large or small bores.

14 Claims, 4 Drawing Sheets

TWO-POINT INTERNAL DIAMETER MEASUREMENT GAGE

BACKGROUND OF THE INVENTION

This invention relates to measurement gages, and more particularly to an improved two-point measurement gage for measuring internal diameters and the like. Even more particularly, this invention relates to a two-point measurement gage which characteristically has a wide measurement range as well as high accuracy and precision.

Conventional I.D.(internal diameter) measurement gages fall into three general categories: two-point measurement gages including calipers and micrometers, three-point measurement gages including bore and plug gages, and three-point bench top gages. Both classifications of three-point gages have accurate measuring capabilities, but they are limited to small measurement ranges. In addition, the three-point bench top gages are costly to use due to the timely mastering requirements and the expensive set of ring masters that is needed. The two-point measurement gages are capable of measuring over wide ranges, however, most conventional two-point gages generally have difficulty repeating measurements.

One particular two-point gage, as disclosed in U.S. Pat. No. 4,208,796, features a floating, adjustably cross-sliding work table which allows an operator to align the part to be measured with respect to the gaging fingers, and a plurality of control means for affecting either the gaging pressure, the precision screw assembly, the indicator or the work table. With that gage the number of parts and their intricate assemblage, results in a rather high cost of production. Another two-point gage, as disclosed in U.S. Pat. No. 2,953,854, features a pin carrying leg which actuates a dial indicator by means of an extension held against the leg by a spring. This device, however, is limited by the fact that the second leg, and the gaging finger thereon, is fixed against movement.

A gage of the type described in U.S. Pat. No. 4,326,336 does not fit into any of the above-mentioned categories, but this gage employs a V-shaped block for positioning the object to be measured in relation to a plurality of adjustable measuring devices. In such an application, the V-shaped block does not function to centrally align the object to be measured, but rather to maintain the object in a position where measurements may be obtained.

It is therefore an object of this invention to provide a two-point I.D. measuring gage having a wide measuring range and a high degree of precision and accuracy within that range.

It is also an object of this invention to provide a two-point measuring gage of the type described which does not require an elaborate set of ring masters for its calibration.

It is also an object of this invention to provide a two-point measuring gage of the type described which may be quickly and easily mastered for each particular measuring operation.

Another object of this invention is to provide a two-point measuring gage having an adjustable gaging force in order to produce accurate measurements on pliable objects.

Yet another object of this invention is to provide a two-point measuring gage which may be simply manufactured.

Other objects of this invention will become apparent when the preferred embodiments and the accompanying drawings are considered in conjunction with the appended claims.

SUMMARY OF THE INVENTION

This gage comprises a frame having thereon a horizontal working surface, and two carriages slidably mounted beneath said working surface for co-linear, reciprocable movement One of the carriages is spring-loaded so that, at rest, it is urged away from the other carriage and toward one of its limit positions. This spring-loaded carriage has adjustably mounted thereon a first, vertical anvil pin which projects above the working surface, and which can be releasably secured in anyone of a plurality of positions longitudinally of its carriage. The second carriage has thereon a second anvil pin which also projects above the working surface parallel to the first anvil pin, and an indicator which is equipped with a digital display, and a springloaded probe, the tip of which is positioned to engage the confronting end of the first carriage.

A centering plate or V-block, which has a V-shaped notch or recess in one side thereof, is adjustably mounted on the work surface with its V-shaped recess facing and centered on the first anvil pin. Assuming by way of example that the gage is to be used to check the inside diameters of the necks of bottles, or the like, which are made to have a predetermined I.D., the gage is calibrated or mastered by a gage block so that the digital readout will be zeroed when the diametrally remote peripheral surface of the anvil pins are spaced apart a distance equal to the desired I.D. The V-block is then adjusted so that the outer periphery of a bottle neck at one diametral side thereof will seat in the V-notch during testing.

The necks of bottles are then inserted one by one over the anvil pins and the spring-loaded carriage is released so that its anvil pin will draw the bottle neck into the V-shaped recess in the V-block, whereby the neck remains properly centered with respect to the second pin, which is engaged with the other side of the inner periphery of the bottle neck. If the I.D. of a bottle neck is larger or smaller than the calibrated or zeroed value of the gage, the probe will detect the difference and indicate the difference on the digital readout.

DETAILED DESCRIPTION OF THE PREFERRED EMBODIMENTS

Figure 1:
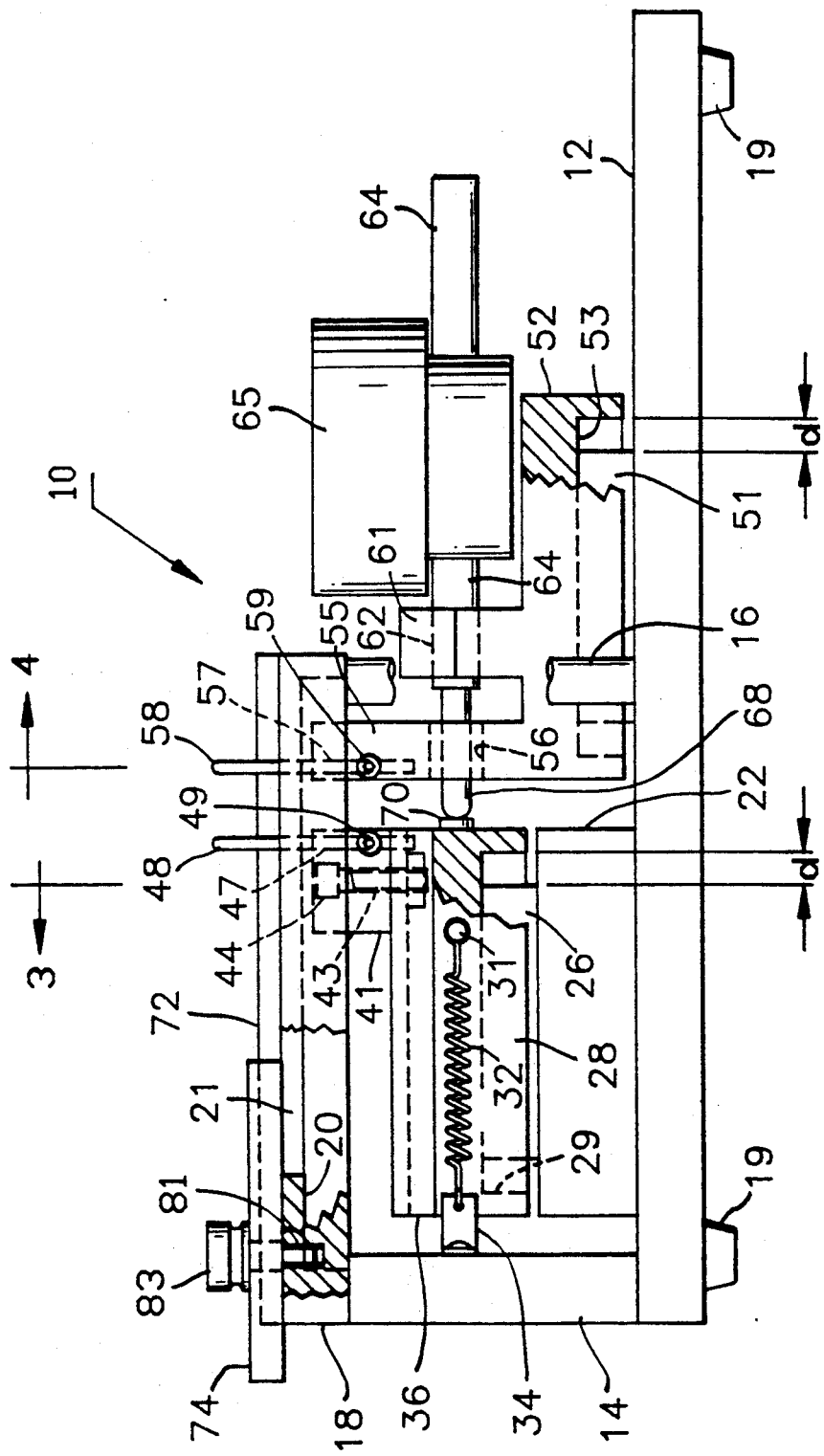
FIG. 1 is a side elevational view of a gage made according to a preferred embodiment of this invention, but with certain portions thereof broken away and shown in section.

Referring now to the drawings by numerals of reference, and first to FIGS. 1-4, 10 denotes generally a two-point measuring gage whose structural frame comprises a base plate 12, an end plate 14 which projects vertically from one end of plate 12 (the left end in FIG. 1), two cylindrical posts 16 and 17 which project upwardly from plate 12 medially of its ends, and a horizontal top plate 18 which is fixed on the upper ends of plate 14 and posts 16, 17 to overlie approximately one half of base plate 12. Base plate 12 is generally rectangularly shaped and has a cushion pad or foot 19 secured to its lower surface adjacent each of the four corners thereof. Top plate 18, which also is rectangularly shaped, has in its lower surface an elongate, generally rectangularly shaped recess or cavity 20, which extends intermediate the ends of plate 18 parallel to and medially of its side edges. Extending through plate 18 centrally of cavity 20, and extending longitudinally of the cavity is an elongate slot 21, the centerline of which lies directly above and parallel to the centerline M (FIG. 2) of gage 10.

Secured to the upper surface of base plate 12 beneath and in vertical registry with recess 20 in top plate 18 is a solid, rectangularly cuboidal shaped slide spacer 22. Centrally secured to the upper surface of slide spacer 22 is a conventional cross roller slide 26, which provide frictionless rolling support for a slide adaptor or pin carrier 28 which is mounted thereon. Roller slide 26 projects upwardly into a rectangularly shaped cavity 29 which is formed centrally in the underside of slide adaptor 28, which thus allows slide adaptor 28 completely to surround roller slide 26. Cavity 29 is also slightly longer than roller slide 26, thereby allowing slide adaptor 28 to reciprocate in opposite directions on slide 26 for a distance as limited by opposite ends of the slide.

A cylindrical pin 31, which is secured to and projects perpendicularly from one lateral side of slide adaptor 28 adjacent one end (the right end thereof in FIGS. 1 and 2), is secured intermediate its ends to one end of a tension spring 32. Welded or otherwise secured adjacent its lower end to the inner surface of end plate 14 near the same lateral side of slide adaptor 28 from which pin 31 projects, is a thin metal bracket 34, the upper end of which is bent more or less 90° outwardly away from plate 14. The opposite end of spring 32 is anchored to bracket 34, whereby the axis of spring 32 extends between pin 31 and bracket 34 parallel to centerline M. Tension spring 32 thus functions to maintain slide adaptor 28 in a position where, at rest, the adaptor is fully shifted towards end plate 14.

Secured to the upper surface of slide adaptor 28 in spaced, parallel relation to each other, and extending parallel to centerline M, are two, inverted, generally L-shaped guide rails 36 and 37 (FIG. 3), which form therebetween an inverted, generally T-shaped guide slot 39. Secured on rails 36 and 37 for adjustment longitudinally thereof, and projecting upwardly into the slot 20 in the underside of top plate 18, is a cubical block or anvil mount 41, which has therethrough a vertical bore 42. Block 41 is secured for sliding adjustment parallel to axis M by a bolt 43 having a head 44 seated in a counterbore in the upper end of bore 42, and a threaded shank that extends downwardly into slot 39. A nut 45 which is threaded onto the lower end of the bolt 43 is slidably seated in the enlarged lower end of slot 39. Thus, when a tool is inserted into the head 44 of bolt 43, the latter can be rotated in a direction to permit adjustment of block 41 longitudinally relative to the rails 36 and 37. Subsequent tightening of bolt 43 will cause block 41 to be secured releasably in its adjusted position.

Secured adjacent its lower end in another vertical bore 47 (FIG. 1)in anvil mount 41 and projecting at its upper end upwardly through slot 21 in the top plate 18 is a first dowel or cylindrical anvil pin 48. Anvil 48 is releasably secured in bore 47 by the inner end of set screw 49 (FIGS. 1 and 2) which is threaded into another bore in mount 41 that extends at right angles to bore 47.

Also secured to the upper surface of base plate 12 in spaced longitudinally registering relation to the slide spacer 22 is another conventional crossed roller slide 51 (FIGS. 1, 2 and 4) which is identical to roller slide 26 in both shape and size. Supported for reciprocal movement on top of roller slide 51 is an indicator adaptor or pin carrier 52 which is identical to slide adaptor 28 in both size and shape. Adaptor 52 projects at its forward end (the left end in FIGS. 1 and 2) between posts 16 and 17, and has in its underside a large rectangular cavity 53 which allows adaptor 52 to reciprocate parallel to centerline M to the extent permitted by roller slide 51.

Secured to and projecting upwardly from the upper surface of indicator adaptor 52 adjacent its forward end in the form of a rectangular plate 55 is a second anvil mount, which has therethrough a circular opening 56 the purpose of which will be noted hereinafter. Removably secured adjacent its lower end in a vertical blind bore 57 which is formed in the upper end of plate 55 is another cylindrical anvil in the form of a dowel pin 58. As in the case of pin 48, the anvil pin 58 is releasably secured in the anvil mount or plate 55 by a set screw 59, which threads into another bore in plate 55 at right angles to bore 57. Also as in the case of anvil pin 48, pin 58 projects upwardly through slot 21 in top plate 18.

Figure 2:
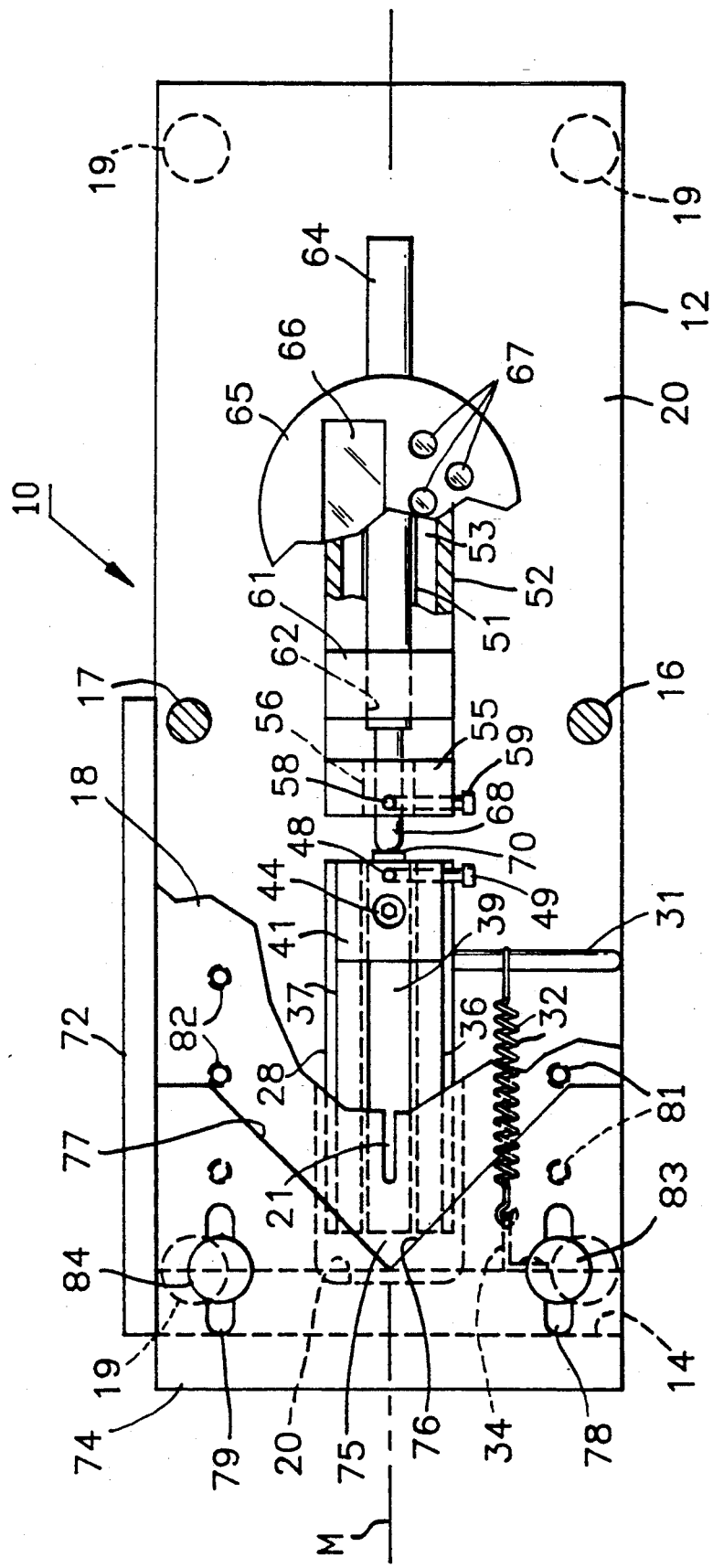
FIG. 2 is a plan view of this gage with certain portions thereof broken away and shown in section.
Figure 3:
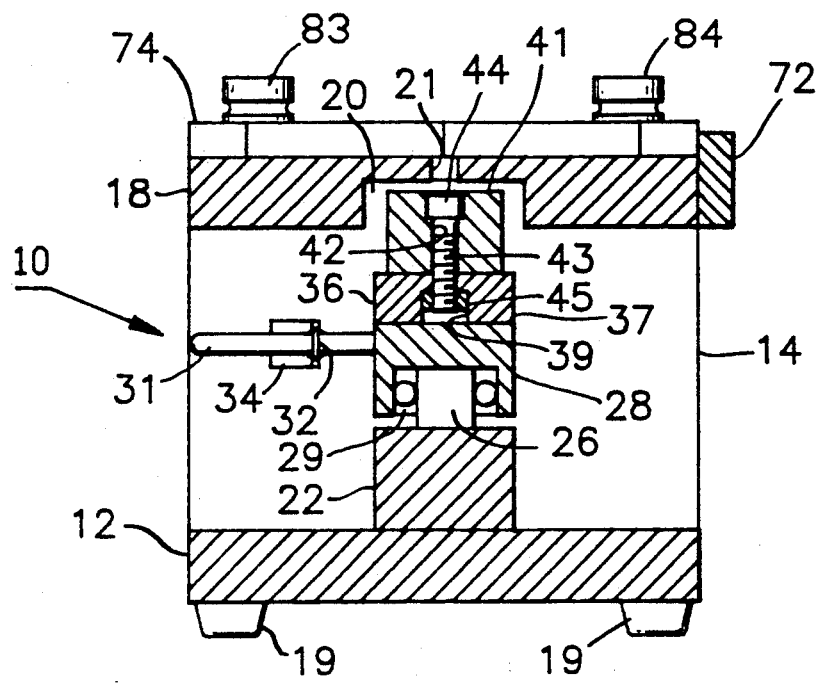
FIG. 3 is a sectional view according to lien 3—3 of FIG. 1 looking in the direction of the arrows.
Figure 4:
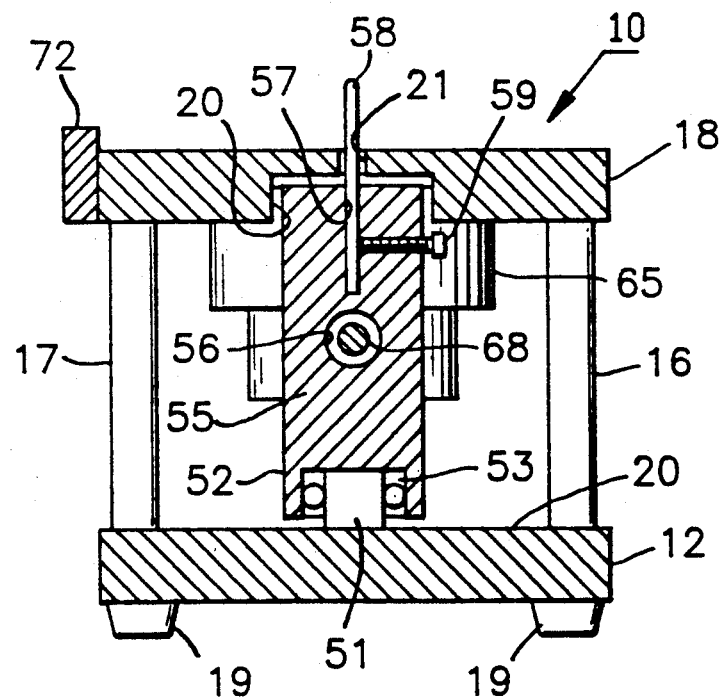
FIG. 4 is a sectional view according to line 4—4 of FIG. 1 looking in the direction of the arrows.

Also secured to the upper surface of indicator adaptor 52 slightly rearwardly or to the right of anvil mount 55 is an indicator mounting block 61, which has therethrough a central cylindrical bore 62 that is disposed in confronting coaxial relation to the bore 56 in anvil mount 55. Removably, secured adjacent its forward end in the bore 62 in block 61 is the barrel 64 of a conventional indicator 65. Indicator 65 has a digital display 66 (FIG. 2), a control panel 67, and a spring-loaded probe or measuring tip 68 which is slidably mounted coaxially in the bore of the indicator barrel 64. Probe 68 at its forward end projects from barrel 64 coaxially and in radially spaced relation through the bore 56 in anvil mount 55, and into engagement with a contact pad 70, which is attached to the right or inner end of slide adaptor 28 as shown in FIGS. 1 and 2.

Figure 5:
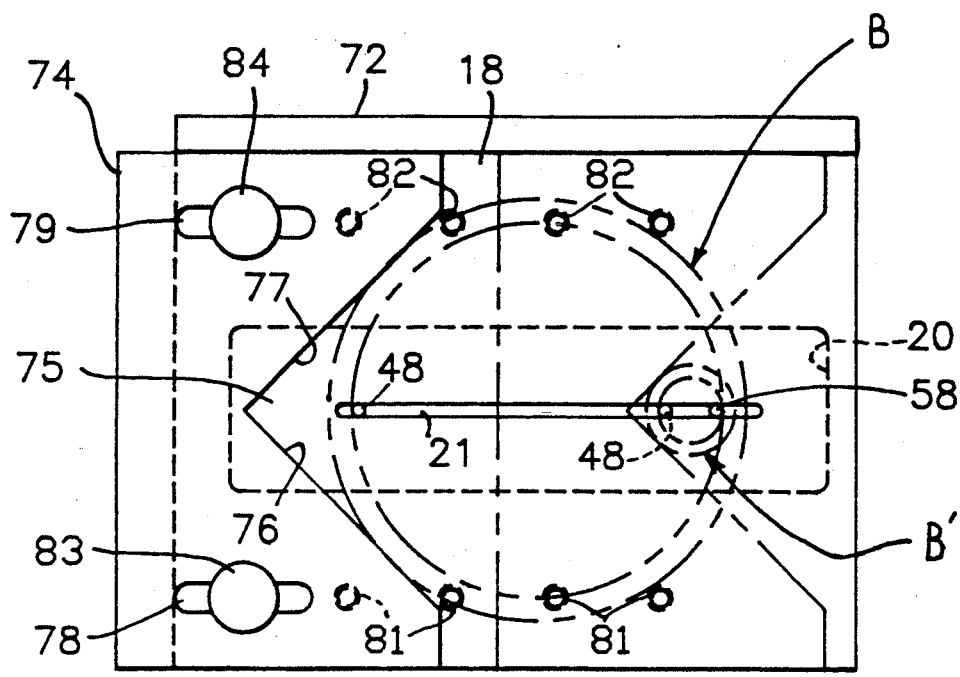
FIG. 5 is a plan view of the top plate of the gage with the associated V-block and anvils being shown in solid lines and broken lines to illustrate different positions thereof when measuring two difference pieces of work that are shown in phantom.
Figure 6:
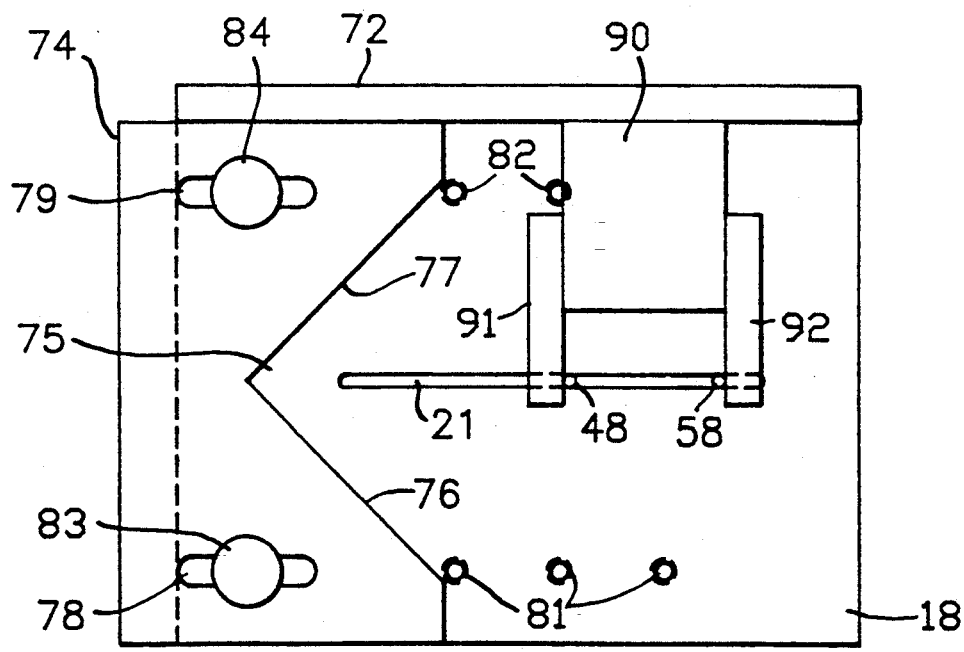
FIG. 6 is a plan view generally similar to FIG. 5, but showing how the gage is mastered or calibrated.

Secured to and projecting slightly above one lateral side of top plate 18 is a guide rail 72, the projecting portion of which provides lateral support for a V-block or work centering plate 74, which is removably and adjustably mounted on top plate 18. Plate 74 has formed centrally in the side thereof which faces the anvil pin 48 a V-shaped notch 75 having inclined side edges 76 and 77 lying in vertical planes which intersect each other at right angles. Plate 74 has therethrough adjacent opposite sides of notch 75, a pair of identical slots 78 and 79, which are aligned with a first pair of laterally spaced, internally threaded bores 81 and 82 that extend through top plate 18. Conventional bolts 83 and 84 which have knurled knobs or heads overlying slots 78 and 79 as shown in FIGS. 2, 5 and 6, have the shanks thereof extending through slots 78 and 79 and threadably into the first pair of bores 81 and 82 to secure plate 74 removably and adjustably in its position as shown by full lines in the drawings. As shown in FIGS. 2, 5 and 6, plate 18 has threrethrough additional pairs of tapped bores 81 and 82 which permit the plate or V-block 74 to be mounted in different positions on top plate 18.

In the embodiment illustrated, the upper ends of both anvil dowels 48 and 58 are cylindrical in configuration and are typical of the type of anvil which will be used to measure straight internal diameters. However, measurement with gage 10 of thread-root diameters and internal grooves will require the use of differently shaped anvil heads, and it is therefore desirable to be able to exchange the anvils in use on a particular measurement gage of the type described. Different anvils therefore may be interchanged by loosening bolts 49 and 59, which will allow anvil dowels 48 and 58 to be removed and replaced.

Prior to conducting measurement operations, such as for example measurement of the inside diameter of a bottle mouth, the above-described two-point measurement gage must first be mastered or calibrated for a desired inside diameter. One such way of mastering gage 10 is shown in FIG. 6, wherein an appropriately selected member 90 of a set of gage blocks is placed against guide rail 72. Thereafter a pair of non-specific gage blocks 91 and 92 may be held against opposite sides of the one member 90, thereby defining between their confronting surfaces the desired master distance. Anvil mounts 41 and 55 are then adjusted to position the anvils 48 and 58 against the inside surfaces of members 91 and 92, and then the indicator 65 is zeroed and the gage blocks are removed.

When the anvils are adjusted as shown in FIG. 6, it is important also that each adaptor 28 and 52 be positioned nearly medially of the distance which it is mounted to reciprocate on its respective cross slide 26 and 51. Ideally this leaves at each end of a respective cross slide a distance d (FIG. 1) separating the end of the slide from the inside of the recess 29 or 53 in the associated adaptor 28 or 52. Also at this time the V-block or work-centering plate may be adjusted on top plate 18 to a position in which its work-centering notch 75 will accommodate the outer periphery of a workpiece which is to be measured.

In order to conduct the measurement operation, reference is made to FIG. 5, wherein two sample annular members that are to be measured are shown in phantom by broken lines, and are denoted by the letters B and B', respectively. Typically these phantom members may represent, for example, the necks of two plastic bottles, the neck B being of substantially larger ID and OD as compared to that of neck B'.

Referring first to the measurement of the larger bottle neck B, the associated bottle must be inverted and placed on the work surface of plate 18 such that the anvils 48 and 52 are contained within the inner perimeter of the bottle mouth B. The slide adaptor or carrier 28 is then allowed freely to slide towards end plate 14 by the action of tension spring 32, whereby anvil pin 48 causes the outer periphery of bottle mouth B to engage in the centering notch 75 of V-block 74, which thereby aligns the bottle mouth B with slot 21. At this stage it is important that each adaptor 28 and 52 still be spaced at each end thereof from their associated cross slide 26 and 51, respectively, so that the latter do not interfere with reciprocable movements of the adaptors 28 and 52. As a consequence, if the internal diameter is too small, the distance separating pins 48 and 58 will be less than the calibrated zero value, and probe 68, by virtue of its engagement with pad 70, will be forced slightly axially inwardly of barrel 64, and will cause the digital read-out 66 to indicate the amount by which the ID was too small. Conversely, if the ID of the bottle neck B is too large, pins 48 and 58 will be separated a distance greater than that for which indicator 65 is zeroed, and probe 68 will be permitted to shift axially outwardly from its zero position in barrel 64 and will thus indicate the amount that the ID exceeds the desired value.

As shown in phantom by broken lines in FIG. 5, if it is desired to measure the I.D. of very small bottle mouths, such as denoted at B', the anvil mount 41 may be adjusted to shift pin 48 toward the right in FIG. 6 to its broken line position; and the V-block 74 may likewise be shifted toward the right to its broken line position to center the bottle neck B' for measurement of its I.D. in a manner that will be apparent from the above disclosure.

From the foregoing, it will be apparent that the present invention provides a two-point measurement gage of relatively simple construction, yet capable of producing highly precise and accurate measurements over a wide measurement range. It should also be apparent that a set of gage blocks, which are less costly than sets of ring gages, will well serve the mastering requirements of the present invention. By mounting the indicator on one of the slide adaptors, it becomes possible easily to adjust the gaging force to be applied to the piece of work, this contributes to the wide variety of objects which may be subjected to measurement operations on the present invention.

While this invention has been illustrated and described with certain crossed roller slides 26 and 51 for providing reciprocable linear travel of the slide adaptor 28 and indicator adaptor 52, respectively, it will be apparent to one skilled in the art that equivalent means may be employed to provide such capability. Likewise, other variations of indicator 65 may be employed without departing from this invention.

Furthermore, while this invention has been illustrated and described in detail in connection with only certain embodiments thereof, it will be apparent that it is capable of still further modifications, and that this application is intended to cover any such modifications as may fall within the scope of one skilled in the art or the appended claims.

We claim:

1. A gage for checking the internal diameters of the bores in annular workpieces comprising
    a frame having thereon a horizontal working surface which has therethrough an elongate slot,
    a pair of carriers mounted on said frame for reciprocation independently of each other along paths which extend beneath and parallel to said slot,
    a pair of anvil pins having upper and lower ends, respectively,
    means mounting said pins adjacent their lower ends on said carriers for reciprocation therewith, and with the upper ends of said pins projecting vertically upwardly through said slot in horizontally spaced parallel relation to each other,
    means for positioning an annular workpiece in a test position on said working surface with the center of the bore in said workpiece registering substantially with the center of said slot, and with said pins projecting onto said bore in said workpiece, and indicator means secured to one of said carriers and having thereon a measuring probe disposed to engage the other of said carriers when said workpiece is in said test position, said probe being operative upon engagement with said other carrier to urge said pins into resilient engagement with diametrally opposite sides of the bore in said workpiece, and simultaneously to cause said indicator means to indicate the extent by which the diameter of said bore, as represented by the horizontal distance between said pins, is less than, or greater than a predetermined value, said positioning means comprising a locating member having a generally V-shaped recess in one side thereof, means for releasably securing said locating member on said working surface with said V-shaped recess facing said pins, and with the vertex of said recess centered on said slot, and resilient means operative when said pins are engaged with said opposite sides of said bore in a workpiece to cause the outer peripheral surface of said workpiece to be urged resiliently into engagement with said V-shaped recess in said locating member centrally thereof.

2. A gage as defined in claim 1, wherein said resilient means is a spring element urging said other carrier in a direction to cause the anvil pin thereon operatively to urge said workpiece toward said recess in said locating member.

3. A gage as defined in claim 1, wherein said means for releasably securing said locating member on said surface includes means for adjusting said locating member longitudinally of said slot to an operating position in which said workpiece is located thereby in said test position in which by virtue of the engagement of said anvil pins with said opposite sides of said bore in said workpiece, said carriers are positioned intermediate the ends of their respective paths of reciprocation on said frame.

4. A gage for checking the internal diameters of the bore in annular workpieces comprising a frame having thereon a horizontal working surface which has therethrough an elongate slot, a pair of carriers each being movably mounted on said frame for limited linear reciprocation independently of and relative to each other along spaced paths which extend beneath and parallel to said slot, a pair of anvil pins having upper and lower ends, respectively, means mounting said pins adjacent their lower ends on said carriers for reciprocation therewith along said spaced paths, and with the upper ends of said pins projecting vertically upwardly through said slot in horizontally spaced parallel relation to each other, means for positioning an annular workpiece in a test position on said working surface with the center of the bore in said workpiece registering substantially with the center of said slot, and with said pins projecting into said bore in said workpiece, indicator means secured on one of said carriers and having thereon a measuring probe disposed to engage the other of said carriers when said workpiece is in said test position, and spring means interposed between said frame and said other of said carriers and operative to urge the anvil pin thereon in one direction and against one diametral side of said bore in said workpiece when the latter is in said test position, said probe being operative when engaged with said other carrier to urge the other of said anvil pins in the opposite direction, and into resilient engagement with the diametrally opposite side of the bore in said workpiece, and simultaneously to cause said indicator means to indicate the extent by which the diameter of said bore, as represented by the horizontal distance between said pins, is less than, or greater than, a predetermined value.

5. A gage as defined in claim 4, wherein said mounting means includes means for releasably securing one of said anvil pins on its associated carrier for limited reciprocation thereby in a first portion of said slot adjacent one end thereof, and means for releasably and adjustably securing the other of said limited reciprocation by the last-named carrier in any one of a plurality of other portions of said slot axially spaced from said first portion of said slot.

6. A gage as defined in claim 4, wherein said mounting means includes, a pin supporting member secured on each of said carriers, and means for releasably securing said pins adjacent said lower ends thereof in vertical bores formed in said pin supporting members to register with said slot in said working surface, and the pin supporting member on said one carrier having therethrough a horizontally disposed bore surrounding said probe in radially spaced relation thereto.

7. A gage as defined in claim 6, including means releasably securing the other of said pin supporting members on said other carrier for adjustment thereon into any one of a plurality of different positions space longitudinally of said slot and said other carrier.

8. A gage as defined in claim 7, including means on said other carrier operable manually to shift said other carrier against the resistance of said spring means thereby to reduce the distance separating said pins.

9. A gage for checking the internal diameters of the bores in workpieces, comprising a frame having thereon a horizontal work supporting surface, a pair of anvil pins having upper and lower ends, respectively, means mounting said pins on said frame with said upper ends thereof projecting above said work supporting surface in spaced parallel relation to each other, and for linear reciprocable movement independently of and relative to each other in horizontally spaced, registering paths, means for positioning a workpiece in a test position on said work supporting surface over said anvil pins, and with said upper ends of said pins projecting into a bore in said workpiece parallel to the axis thereof, resilient means interposed between said frame and one of said pins and operative to urge said one pin in one direction and against one diametral side of said bore in said workpiece when the latter is in said test position, and indicator means interposed between said pins and operative when checking an internal diameter to urge the other of said pins in the opposite direction, and resiliently against the diametral opposite side of said bore in said workpiece, said indicator means including means operative, when said pins are engaged with said diametrally opposite sides of said bore, to indicate the extent to which the diameter of said bore differs from a predetermined value, and said workpiece positioning means including a workpiece locating member mounted on said frame for engagement with the exterior of a workpiece located in said test position, and operative to position said workpiece on said surface so that said pins are positioned intermediate their respective paths of reciprocation.

10. A gage as defined in claim 9, wherein said pin mounting means includes, a pair of carriers moveably mounted on said frame for limited reciprocation in spaced paths parallel to the paths of reciprocation of said pins, and means releasably securing said pins adjacent said lower ends thereof to said carriers for reciprocation thereby, said indicator means being mounted on one of said carriers and having a probe resiliently engaging the other of said carriers thereby operatively to urge said pins away from each other.

11. A gage as defined in claim 10, wherein said means for securing said pins to said carriers includes means for adjustably mounting said one pin on said other carrier for adjustment longitudinally of said other carrier without altering the effect of said resilient means on said one pin, and the pressure exerted by said probe on said other carrier.

12. A gage as defined in claim 9, wherein said workpiece supporting surface has therethrough an elongate slot, said upper ends of said anvil pins project upwardly through said slot and above said work supporting surface, and said workpiece locating member is a plate adjustably secured on said workpiece supporting surface and having in one side thereof a recess centered on said slot and facing said one pin, whereby when a workpiece is supported in a test position over said pins, said resilient means causes said one pin to urge said workpiece toward said recess in said plate, thereby to engage the exterior of said workpiece in said recess.

13. A gage as defined in claim 12, wherein said recess is generally V-shaped in configuration.

14. A gage as defined in claim 9, wherein said pin mounting means includes means adjustably mounting said one pin on said frame for movement selectively toward and away from, respectively, said other pin, thereby selectively to adjust the horizontal space separating said paths of recriprocation of said pins.

* * * * *